US006879913B1

(12) United States Patent
Yu (10) Patent No.: US 6,879,913 B1
(45) Date of Patent: Apr. 12, 2005

(54) INDOOR GPS CLOCK

(75) Inventor: Yiming Yu, Cupertino, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 10/723,082

(22) Filed: Nov. 26, 2003

Related U.S. Application Data (63) Continuation of application No. 10/167,101, filed on Jun. 10, 2002, now Pat. No. 6,725,157.

(51) Int. Cl.[7] .......................... G04C 11/02; H04B 1/69; G01S 5/02
(52) U.S. Cl. .................. 701/214; 342/357.02; 375/142
(58) Field of Search .................. 701/214; 342/357.02, 342/357.05, 357.12, 357.01; 375/142, 150, 326, 343

(56) References Cited

U.S. PATENT DOCUMENTS

| | | | | |
|---|---|---|---|---|
| 4,849,993 | A | | 7/1989 | Johnson et al. ............. 375/108 |
| 5,666,330 | A | * | 9/1997 | Zampetti ..................... 368/47 |
| 5,861,842 | A | | 1/1999 | Hitch et al. ................. 342/357 |
| 5,864,315 | A | * | 1/1999 | Welles et al. .......... 342/357.12 |
| 6,028,883 | A | * | 2/2000 | Tiemann et al. ............ 375/150 |
| 6,178,197 | B1 | * | 1/2001 | Froelich et al. ............. 375/150 |
| 6,289,041 | B1 | | 9/2001 | Krasner ...................... 375/152 |
| 6,400,314 | B1 | | 6/2002 | Krasner .................. 342/357.09 |
| 6,466,164 | B1 | | 10/2002 | Akopian et al. ....... 342/357.15 |
| 6,510,387 | B2 | | 1/2003 | Fuchs et al. ................. 701/213 |
| 6,512,479 | B1 | | 1/2003 | Sahai et al. ............ 342/357.15 |
| 6,529,160 | B2 | | 3/2003 | Jandrell .................. 342/357.12 |
| 6,532,251 | B1 | * | 3/2003 | King et al. .................. 375/142 |
| 6,661,371 | B2 | * | 12/2003 | King et al. ............ 342/357.02 |

OTHER PUBLICATIONS

David M. Lin & James B. Y. Tsui, "An Efficient Weak Signal Acquisition Algorithm for a Software GPS Receiver", Proceedings of Institute of Navigation Global Positioning System (ION GPS) conference, Sep. 11–14, 2001, Salt Lake City, Utah, pp. 115–136.

Mark Moeglein & Norman Krasner, "An Introduction to SnapTrack™ Server–Aided GPS Technology", Proceedings of Institute of Navigation Global Positioning Systems (ION GPS) conference 1998, pp. 333–341.

"Guidelines for the Global Positioning System (GPS) Receiver Application Module", GPS–GRAM–001A (Internet), Headquarters, Space and Missile Systems Center NAVSTAR GPS Joint Program Office, El Segundo, California, Feb 24, 1998, pp. 12–86.

"ThunderBolt™ GPS Disciplined Clock Manual", Version 3.0, Sep., 2000, Trimble Navigation Limited, Sunnyvale, California.

* cited by examiner

Primary Examiner—Thomas G. Black
Assistant Examiner—Dalena Tran
(74) Attorney, Agent, or Firm—Menlo Patent Agency LLC; David R. Gildea (57) ABSTRACT

An indoor GPS clock using GPS signals lower that –143 dBm for issuing disciplined frequency and time standard signals. The indoor GPS clock includes a correlation machine using long integration periods for enabling the indoor GPS clock to operate with low signal levels; a carrier-less tracking loop for tracking the low level signals without carrier offset feedback, a clock bias loop for providing clock bias feedback; and a reference oscillator using the clock bias feedback for providing disciplined frequency and time signals having greater accuracy than is available in conventional GPS positioning receivers. The indoor GPS clock also includes a holdover driver providing compensation for predicted drift in clock bias error for disciplining the reference oscillator for several hours when the GPS signal is no longer being received.

36 Claims, 9 Drawing Sheets

INDOOR GPS CLOCK

CROSS REFERENCE TO RELATED APPLICATIONS

This application is a continuation of application Ser. No. 10/167,101 filed Jun. 10, 2002 now U.S. Pat. No. 6,725,157 by the same inventor and assigned to the same assignee.

BACKGROUND OF THE INVENTION

1. Field of the Invention

The invention relates generally to GPS clocks and more particularly to an indoor GPS clock using long integration periods for acquiring and tracking GPS signals lower than about −143 dBm and providing disciplined frequency and time standard signals.

2. Description of the Prior Art

Conventional GPS positioning receivers provide GPS-based time as a byproduct of the resolution of a three dimensional GPS-based location. Typically, this time is issued in the form of a data packet that identifies the GPS-based times of the pulses of a one pulse per second (1 PPS) output signal. However, the accuracy for such time is limited by the cycle period of the local reference oscillator in the GPS receiver and any uncalibrated electrical length that the signal travels before it is used. There are several GPS timing applications where these limitations are not acceptable. Therefore, GPS timing applications commonly require a higher frequency signal, for example 10 MHz, for use as an accurate time base for maintaining an internal time standard. In order to meet the needs of these applications, a special type of GPS receiver, termed a GPS clock, has been developed. GPS clocks use supplementary techniques, such as clock bias feedback, for providing an output signal having a frequency that closely tracks the frequency of the GPS signal.

In some cases accurate time and/or frequency are required at a user location that is inside of a building. It is well-known that GPS receivers do not function well within a building because the building attenuates the GPS signal to a level that is too low for acquisition and/or tracking. It is sometimes possible to avoid this problem by placing the GPS signal antenna outdoors or by a window with a clear sky view and then conducting an amplified antenna output signal or the frequency and time signal to where it is needed. However, there are certain circumstances where this is impractical.

A clear-view GPS signal available to a GPS antenna on earth from a GPS satellite is specified as −160 dBW (−130 dBm) by the GPS system specification ICD-GPS-200 Rev C published by Arinc Research Corporation of El Segundo, Calif. published 10 Oct. 1993 and last revised 11 Oct. 1999. Misra and Enge in "Global Positioning System" ISBN 0-9709544-0-9 page 288 also show −160 dBW (−130 dBm) as received power available to an isotropic antenna from a satellite at the zenith. Conventional GPS receivers acquire GPS signals as low as −130 dBm using a signal integration period matching the C/A PRN code epoch period of one millisecond. In addition, it is known by those skilled in the art that an integration period matching the GPS bit time of 20 milliseconds can be used for achieving a processing gain of 13 dB in order to acquire and/or track GPS signals as low as about −143 dBm.

The attenuation of the building will vary a great deal depending upon the type of building and the depth within the building. However, it is typically true that a building attenuates a GPS signal by more than 13 dB so that the GPS signal is lower than the signal acquisition that is achievable with a 20 millisecond integration. Recently, many workers have applied a great deal of energy to inventing techniques for receiving low level (that is more than 13 dB lower than open sky) signals. Unfortunately, to date these techniques have not been applied in an indoor GPS clock that is capable of providing the frequency and time accuracies that are required.

One of the problems that must be resolved for low GPS signal levels is the problem of GPS signal carrier tracking. Conventional GPS receivers employ closed loop carrier phase or carrier frequency feedback corrections for tracking a GPS signal. However, below 27 dB-Hz $C/N_0$ (−143 dBm referred to the antenna) and 24 dB-Hz $C/N_0$ (−146 dBm referred to the antenna) typical GPS carrier phase and frequency lock loops, respectively, are not able to lock reliably. Existing military type GPS receivers have used a technique of carrier aiding by Doppler calculations. However, techniques used in military receivers are not directly applicable to a high performance OPS clock because a military GPS receiver must operate in a high dynamic environment whereas a GPS clock is expected to operate in an environment that is stationary. Furthermore, the GPS clock must provide an accurate frequency standard signal as an output that tracks the carrier frequency of the GPS signal.

SUMMARY OF THE INVENTION

It is therefore an object of the present invention to provide an indoor GPS clock capable of using low level GPS signals for providing accurate GPS-based frequency and time.

Briefly, the indoor GPS clock of the present invention is a novel combination of features using a processing gain of greater than 13 dB for acquiring and tracking low level GPS signals for providing a highly accurate GPS-based frequency. In a base coherent embodiment, the indoor GPS clock uses GPS data bit length (20 millisecond) coherent integrations for acquisition and tracking of low level GPS signals. In an extended coherent embodiment the indoor GPS clock uses coherent integration periods longer than the GPS bit data for acquisition of low level GPS signals. In a coherent-incoherent embodiment, the indoor GPS clock incoherently combines coherent integration periods for acquisition of low level GPS signals. The low level GPS signals are then tracked with carrier-less tracking using GPS data bit length coherent integration periods. A clock bias feedback loop provides feedback for disciplining frequency and time signals. A holdover driver compensates for drift in the disciplined frequency and time signals for at least several hours in the absence of the GPS signal.

An advantage of the present invention is that an accurate GPS-based frequency is provided within a building where GPS signal levels are lower than about −143 dBm.

These and other objects and features of the present invention will no doubt become obvious to those of ordinary skill in the art after having read the following detailed description of the preferred embodiments which are illustrated in the various figures.

DETAILED DESCRIPTION OF THE PREFERRED EMBODIMENTS

Figure 1:
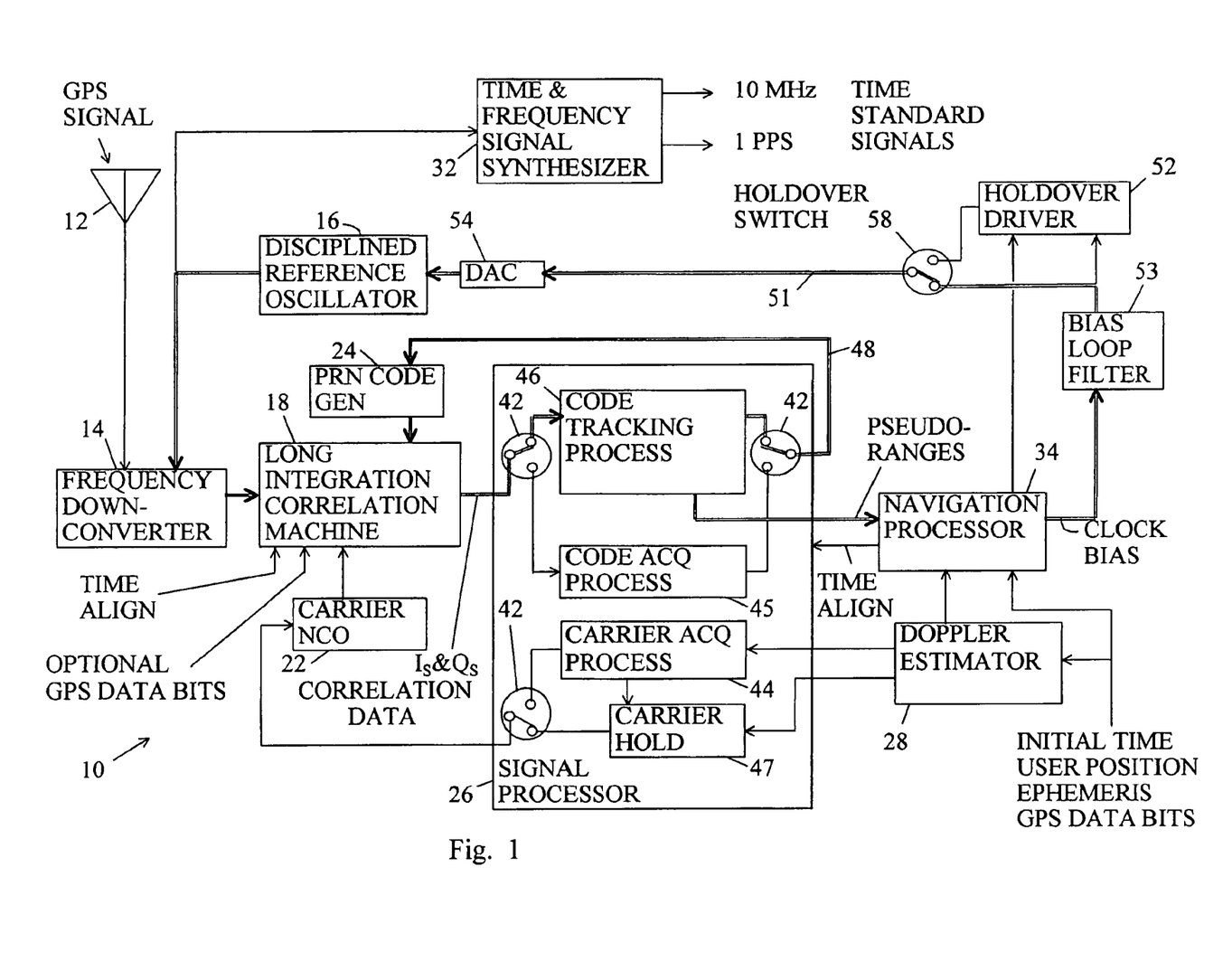
FIG. 1 is a block diagram of an indoor GPS clock of the present invention.

FIG. 1 is a block diagram of an indoor GPS clock of the present invention referred to with a reference number 10. It is expected that the indoor GPS clock 10 is maintained in a single user location for any one period of operation. To initialize the operation, the indoor GPS clock 10 receives information for an accurate user location, recent satellite ephemeris parameters, and time to within ±½ millisecond. In an exemplary case, the user location can be determined with survey techniques and the ephemeris parameters can be received and updated from a network connection.

The initial ±½ millisecond time can be determined by the indoor GPS clock 10 itself by operating first outdoors in the manner of a conventional GPS receiver. The indoor GPS clock 10 is then carried indoors to its user location. Or, when one strong GPS signal is available, for example from a pseudolite or a GPS satellite with line of sight through a window, the indoor GPS clock 10 can determine the initial ±½ millisecond time from that pseudolite or GPS satellite in the manner of a conventional GPS receiver. The initial time can also be determined outdoors with a handheld GPS receiver that is capable of maintaining and providing ±½ millisecond time for at least a few minutes after it loses the GPS signal when it is carried indoors and connected to the GPS clock 10.

U.S. patent application Ser. Nos. 09/860,125 entitled "Signal Receiver Using Coherent Integration in Interleaved Time Periods for Signal Acquisition at Low Signal Strength" and Ser. No. 09/893,179 entitled "Signal Receiver for Integrating and Combining Integrations in Alternating Time Segments for Signal Acquisition at Low Signal Strength" are incorporated herein by reference.

The indoor GPS clock 10 includes an antenna 12, a frequency downconverter 14, a disciplined reference oscillator 16, a long integration correlation machine 18, a carrier numerically controlled oscillator (NCO) 22, a pseudorandom (PRN) code generator 24, a signal processor 26, a Doppler estimator 28, a frequency and time signal synthesizer 32, and a navigation processor 34. The antenna 12 converts an airwave GPS signal to a conducted form. The frequency downconverter 14 uses a reference signal from the reference oscillator 16 for downconverting the radio frequency (RF) of the conducted GPS signal to a lower frequency and providing digital I (in-phase) and Q (quadrature phase) samples of the GPS signal to the correlation machine 18.

The carrier NCO 22, the PRN generator 24, and other elements of the indoor GPS clock 10 use the disciplined reference signal as a time base. The correlation machine 18 correlates the GPS signal samples with a carrier mixing signal from the carrier NCO 22 and a PRN code replica signal from the PRN generator 24 and integrates the correlations for selected coherent integration periods for providing I and Q correlation data to the signal processor 26.

The signal processor 26 has a signal acquisition mode and a signal tracking mode shown schematically with an acquisition/tracking (A/T) switch 42. FIG. 1 shows the A/T switch 42 in the tracking mode. The correlation machine 18 provides coherent integration periods for signal acquisition and/or signal tracking that are at least ten and preferably about twenty epochs (20 milliseconds for the C/A code) of the PRN code period of the GPS signal. In addition, the signal processor 26 has an extended coherent mode, described below, using data stripping for extending the coherent integration periods beyond 20 milliseconds.

The signal processor 26 has a carrier acquisition process 44, a code acquisition process 45, a code tracking process 46, and a carrier hold 47. These processes 44–47 are implemented in a shared combination of hardware and embedded software in a digital signal processor (DSP), a microprocessor and a memory. The following text describes the processing of a single channel for a GPS signal for a single GPS satellite. However, it should be understood that parallel channels may be used for processing the GPS signals from several GPS satellites more or less simultaneously.

The Doppler estimator 28 uses the orbital ephemeris parameters for the satellite, time, and user position for estimating Doppler shift of the GPS signal. The carrier acquisition process 44 uses the estimated Doppler shift for presetting the carrier NCO 22 to a carrier mixing frequency so that the effect of the estimated Doppler shift is eliminated. The code acquisition process 45 observes and processes the I (in-phase) and Q (quadrature phase) correlation data, described in greater detail below, for controlling the PRN code generator 24 to select a particular replica PRN cod e and then to sequence through the possible phase offsets of the co de. Several PRN codes may be tried. Detection of the GPS signal is indicated when some function of the levels of the I and Q correlation data meets a certain threshold. If the GPS signal is not detected after all phase offsets have been tried, the carrier acquisition process 44 sets the carrier NCO 22 to another replica frequency and the code acquisition process 45 is repeated.

When the GPS signal is detected, the carrier acquisition process 44 sets the carrier hold 47 so that the corresponding carrier mixing frequency is maintained by the carrier NCO 22. The code tracking process 46 uses the PRN code and code phase offset to initiate the signal tracking mode. In the signal tracking mode the code tracking process 46 uses the I and Q correlation data for coherent tracking integration periods of about twenty epochs (20 milliseconds for GPS C/A code) to provide feedback for adjusting the phase offset of the PRN generator 24. This feedback is filtered in the code tracking process 46 in order to track GPS signals lower than −143 dBm. The Doppler estimator 28 continues to compute Doppler shifts for the satellites and passes the new Doppler shifts to the carrier hold 47. The carrier hold 47 readjusts the carrier NCO 22 accordingly so that the carrier mixing frequency remains at least within an estimated ±25 Hertz of the actual GPS signal.

It should be noted that the PRN code generator 24, the correlation machine 18 and the code tracking process 46 form a signal tracking loop referred to by a reference number 48. Importantly, the indoor GPS clock 10 uses a technique described herein as carrier-less tracking. In conventional GPS receivers, the GPS signal is tracked with two loops, a code tracking loop and a carrier tracking loop. The carrier tracking loop in typical GPS receivers uses carrier phase or carrier frequency derived from the carrier of the GPS signal. In the typical GPS receiver the I and Q correlation data is used for providing a frequency feedback correction adjustment to a carrier NCO so that the carrier mixing frequency tracks the carrier frequency of the GPS signal. In the indoor GPS clock 10, changes in the mixing frequency from the NCO 22 are controlled by the Doppler estimator 28 and the carrier hold 47 and not by the I and Q correlation data. That is, the carrier tracking loop process that is found in typical GPS receivers and/or GPS clocks has been eliminated.

The code tracking process 46 provides pseudoranges to the navigation processor 34. The navigation processor 34 uses the pseudoranges with the user position, ephemeris orbital parameters, and time in a set of GPS navigation equations for resolving a clock bias error. The clock bias error corresponds to the phase error of the reference oscillator 16. The navigation processor 34 also uses the pseudoranges with the user location, ephemeris orbital parameters, and time for providing time align information to align the correlation machine 18 and the signal processor 26 with the 20 millisecond transitions in GPS data bits.

The indoor GPS clock 10 also includes a clock bias loop 51 and a holdover driver 52. The clock bias loop 51 includes a clock bias filter 53 and a digital-to-analog converter (DAC) 54. The clock bias filter 53 receives the clock bias error from the navigation processor 34. The clock bias filter 53 may include differentiators, integrators, amplifiers and/or filters for setting the bias loop time constant, stabilizing the loop, and providing a conditioned clock bias error to the DAC 54. The bias loop time constant is between one second and four hundred seconds and preferably between one hundred fifty seconds and two hundred fifty seconds. The DAC 54 converts the conditioned clock bias error from digital to analog form and uses the analog clock bias error to control the reference oscillator 16 in order to provide the disciplined reference signal. It should be noted that the clock bias loop 51 also includes the reference oscillator 16, the frequency downconverter 14, the signal tracking loop 48 (including the PRN code generator 24, the correlation machine 18, and the code tracking process 46), and the navigation processor 34.

The synthesizer 32 uses the disciplined reference signal as the time base for synthesizing frequency and time standard signals at various frequencies such as 10 MHz and 1 pulse per second (PPS). The frequency and time standard signals have a frequency accuracy of one part in $10^{-11}$ after one day of continuous operation. The synthesizer 32 issues the frequency and time signals as outputs from the indoor GPS clock 10. It should be noted that the time-of-transmission of the 1 PPS signal and the phase of the 10 MHz signal are synchronized with the phase of the disciplined reference signal to track GPS-based time and carrier phase, thereby eliminating the cycle period ambiguities of the 1 PPS and 10 MHz signals that are found in a conventional GPS receiver.

The indoor GPS clock 10 has a normal operation mode and a holdover mode shown schematically with a holdover switch 58. FIG. 1 shows the holdover switch 58 in the normal mode. In the normal mode, the code tracking process 46 tracks the code in the GPS signal; the carrier hold 47 provides updates of the Doppler shift estimates; and the clock bias loop filter 53 provides a closed loop correction to the disciplined reference oscillator 16 through the DAC 54. In the holdover mode, in the absence of GPS signal tracking, the holdover driver 52 provides a predicted conditioned clock bias error to the DAC 54 to compensate for expected temperature drift and expected aging of the reference oscillator 16. The aging may be initially determined when the indoor GPS clock 10 is manufactured or may be learned while the code tracking process 46 is tracking the GPS signal. The temperature drift may also be initially determined when the indoor GPS clock 10 is manufactured or may be learned with the aid of an internal temperature sensor while the code tracking process 46 is tracking the GPS signal.

The term "coherent integration period" is used herein when GPS signal correlation levels are accumulated (integrated) linearly. For example, if $I_1$ and $Q_1$, $I_2$ and $Q_2$, and $I_3$ and $Q_3$ are GPS signal correlations during a coherent integration period, then the coherent integrated (accumulated) I correlation level is $I_1+I_2+I_3$; the Q correlation level is $Q_1+Q_2+Q_3$; and the correlation power is proportional to $(I_1+I_2+I_3)^2+(Q_1+Q_2+Q_3)^2$. The processing gain for coherent integration increases by 3 dB for each doubling of length of the coherent integration period. The term "incoherent sum" is used herein when GPS signal correlation powers are summed. For example, if $I_1$ and $Q_1$, $I_2$ and $Q_2$, and $I_3$ and $Q_3$ are GPS signal correlations during three coherent integration periods, then the incoherent sum of the correlation powers is proportional to $I_1^2+Q_1^2+I_2^2+Q_2^2+I_3^2+Q_3^2$. The incoherent summation increases by 1.5 dB for each doubling of the number of (equal length) coherent integration periods. Therefore, coherent integration offers twice the processing gain. However, a factor to two longer coherent integration period tightens the accuracy and stability requirements of locally generated signals by a factor of two; whereas doubling the number of coherent integration periods in an incoherent summation has little or no effect on these requirements.

Figure 2A:
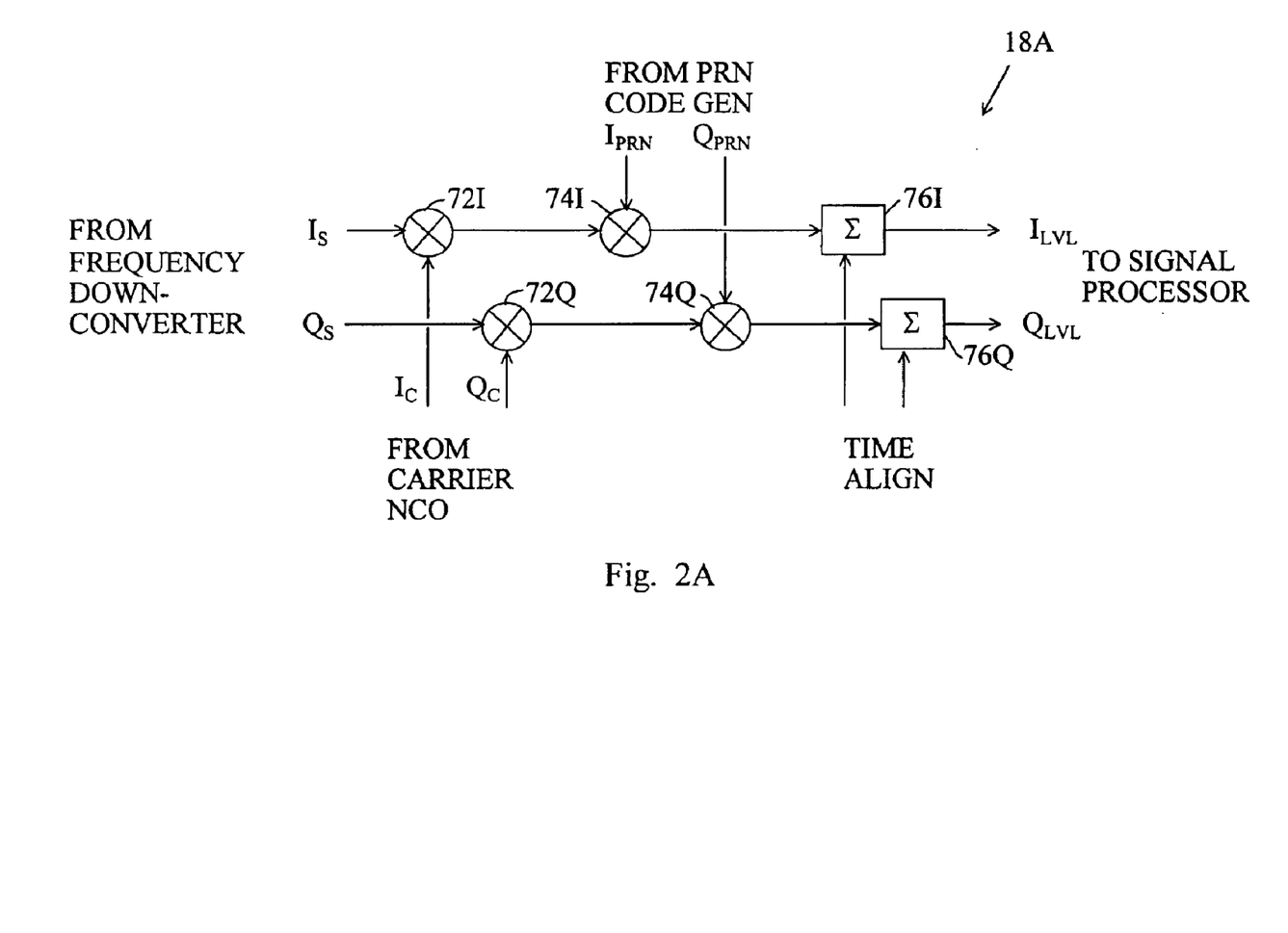
FIGS. 2A and 2B are block diagrams of frequency and time domain embodiments, respectively, of a long integration correlation machine of the indoor GPS clock of FIG. 1.

FIG. 2A is a block diagram of a time domain embodiment 18A of the long integration correlation machine 18. The correlation machine 18A includes I and Q carrier multipliers 72I and 72Q, I and Q code multipliers 74I and 74Q, and I and Q accumulators 76I and 76Q. The I and Q carrier multipliers 72I and 72Q multiply $I_S$ and $Q_S$ GPS signal samples from the frequency downconverter 14 by $I_C$ and $Q_C$ carrier mixing samples from the carrier NCO 22 for providing I and Q intermediate products. The I and Q code multipliers 74I and 74Q multiply the I and Q intermediate products by $I_{PRN}$ and $Q_{PRN}$ code replica samples from the PRN code generator 24 for providing I and Q code correlations. The I and Q accumulators 76I and 76Q use the 20 millisecond time alignment (see FIG. 4A) from the navigation processor 34 for accumulating the I code correlations and the Q code correlations, respectively, for 20 millisecond integration periods to provide the I and Q correlation data ($I_{LVL}$ and $Q_{LVL}$) to the digital signal processor 26.

Figure 2B:
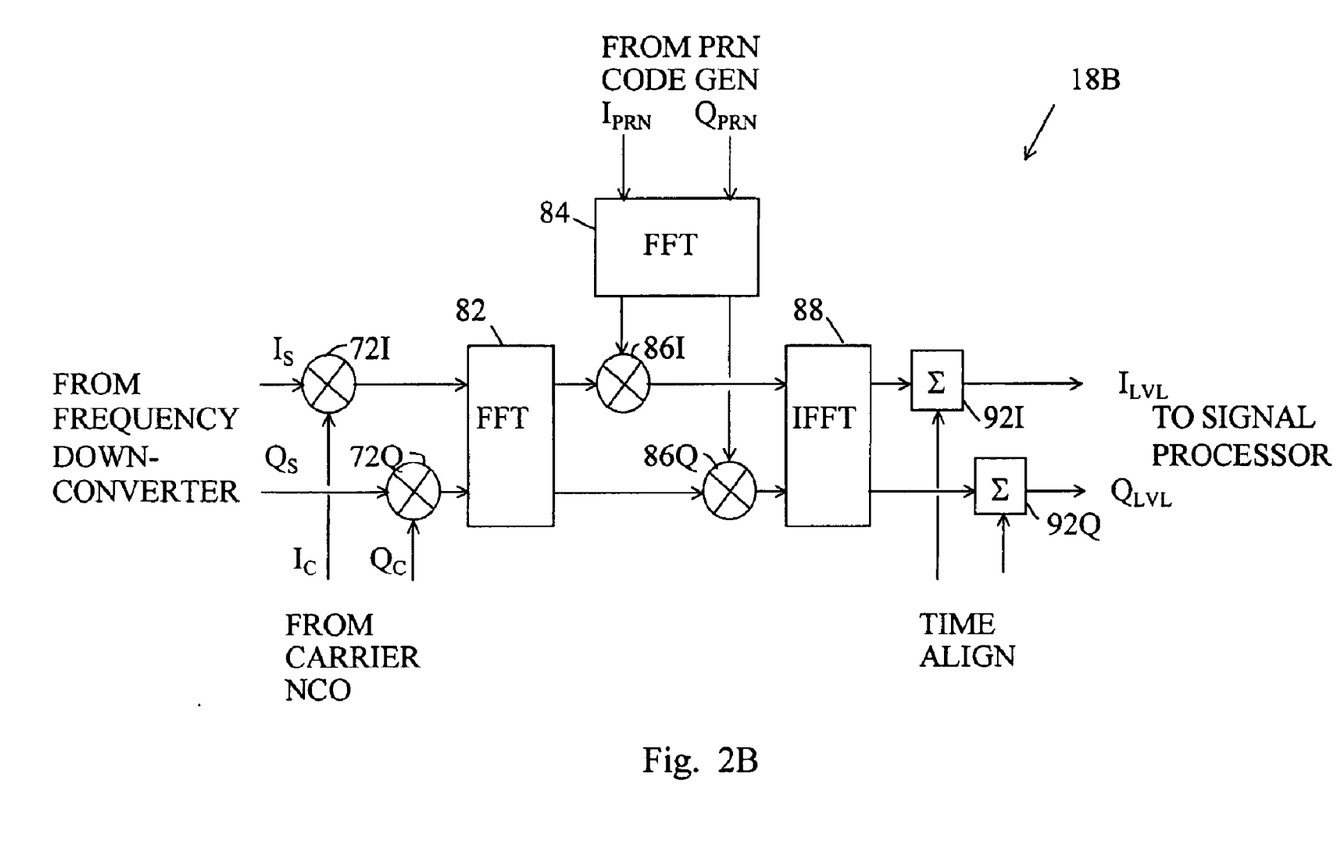

FIG. 2B is a block diagram of a frequency domain embodiment 18B of the long integration correlation machine 18. The correlation machine 18B includes I and Q carrier multipliers 72I and 72Q, a signal fast Fourier transform (FFT) converter 82, a code FFT converter 84, I and Q code multipliers 86I and 86Q, a signal inverse fast Fourier transform (IFFT) converter 88, and I and Q accumulators 92I and 92Q. The I and Q carrier multipliers 72I and 72Q multiply $I_S$ and $Q_S$ GPS signal samples from the frequency downconverter 14 by $I_C$ and $Q_C$ carrier mixing samples from the carrier NCO 22 for providing I and Q intermediate products. The signal FFT converter 82 transforms the I and Q intermediate products into the frequency domain. The code FFT converter 84 transforms the PRN code into the frequency domain.

The I and Q code multipliers 86I and 86Q multiply the frequency domain I and Q intermediate samples by the frequency domain $I_{PRN}$ and $Q_{PRN}$ code samples to provide frequency domain I and Q code correlations. The signal IFFT converter 88 converts the frequency domain I and Q code correlations to the time domain. The I and Q accumulators 92I and 92Q use the 20 millisecond time alignment (see FIG. 4A) from the navigation processor 34 for accumulating 20 iterations of the 1 millisecond epoch of the I code correlations for each PRN code phase separately for providing I correlation data ($I_{LVL}$) and accumulating 20 iterations of the 1 millisecond epoch of the Q code correlations for each PRN code phase separately for providing Q correlation data ($Q_{LVL}$).

For an exemplary case of ½ chip spacing, 1023 code phases, and 20 code epochs of coherent integration, the correlation machine 18 provides $I_{LVL}$ correlation data for 2*1023*20=40,920 phase offsets and $Q_{LVL}$ correlation data for 2*1023*20=40,920 phase offsets.

Figure 3A:
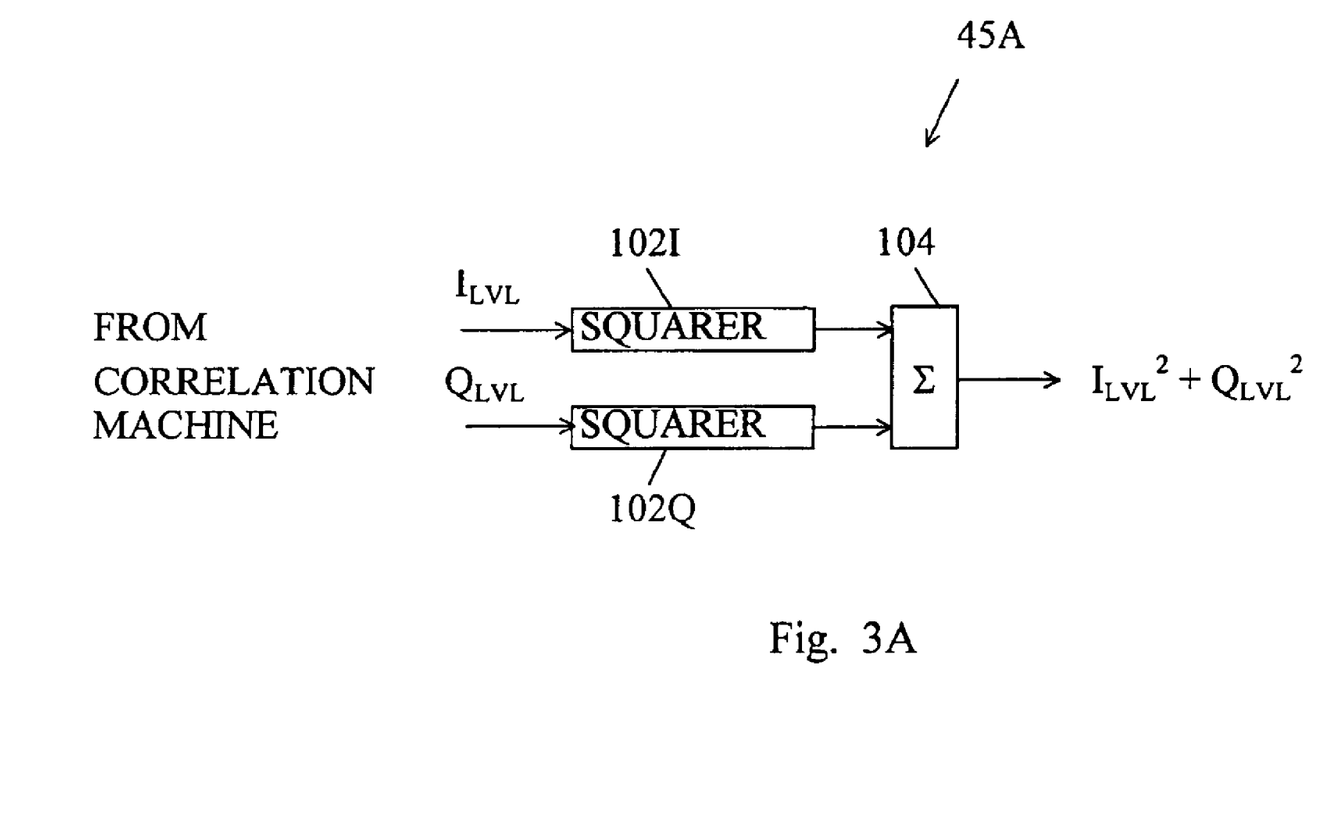
FIGS. 3A, 3B, and 3C are block diagrams of a base coherent, an extended coherent, and a coherent-incoherent embodiment, respectively, of a code acquisition process of the indoor GPS clock of the FIG. 1.
Figure 3B:
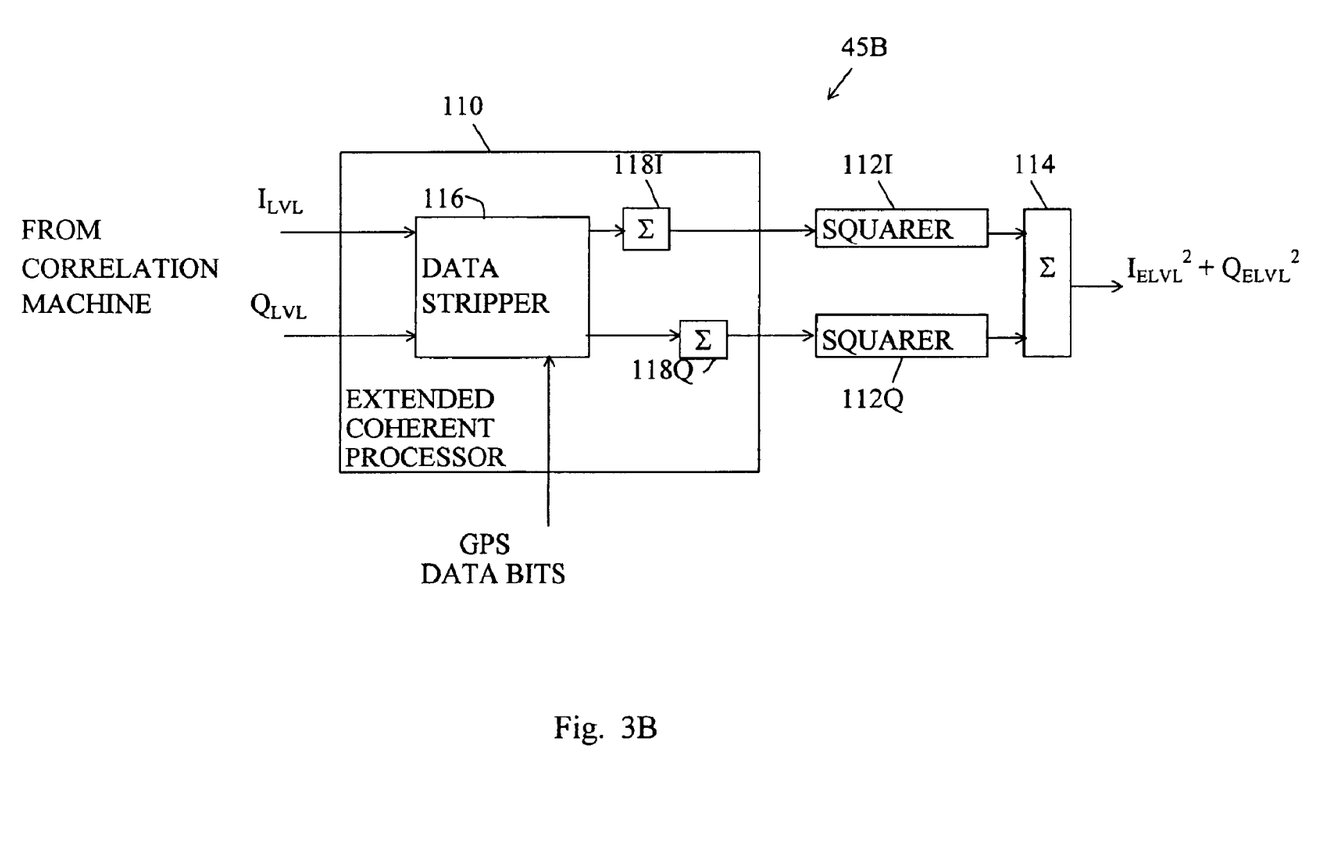
Figure 3C:
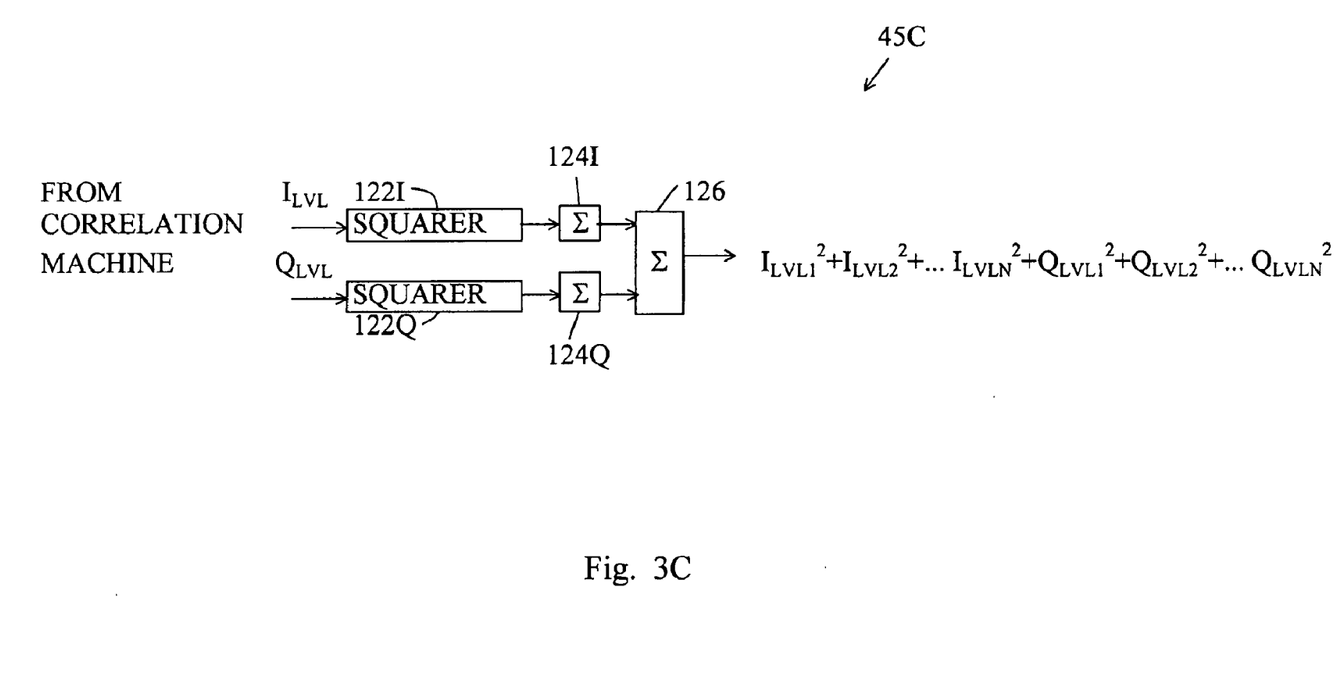

There are three embodiments of the code acquisition process 45, a base coherent embodiment illustrated in FIG. 3A, an extended coherent embodiment illustrated in FIG. 3B, and a coherent-incoherent embodiment illustrated in FIG. 3C.

FIG. 3A is a block diagram of the base coherent embodiment 45A of the code acquisition process 45. The code acquisition process 45A includes squarers 102I and 102Q and a summer 104. The squarers 102I and 102Q square the $I_{LVL}$ and $Q_{LVL}$ correlation data. The summer 104 sums the squared levels of the $I_{LVL}$ and $Q_{LVL}$ correlation data for providing the sum of the squares ($I_{LVL}^2 + Q_{LVL}^2$). The largest of the sums is compared to an acquisition threshold. When the largest sum exceeds the threshold, the corresponding code phase is used as the initial code phase for the code tracking process 46. Considering −130 dBm as a reference for the lowest GPS signal level that can be properly received with one millisecond coherent acquisition integration periods as 0 dB processing gain, the base coherent embodiment provides a processing gain of 13 dB, thereby enabling reception at about −143 dBm. Of course, it is understood by those skilled in the art that other factors may degrade performance so that the lowest reception levels will not be quite as good in practice as the above calculated lowest reception levels. It is also understood that antenna directivity can also be used independently to provide gain to receive lower level signals.

FIG. 3B is a block diagram of the extended coherent embodiment 45B of the code acquisition process 45. The code acquisition process 45B includes an extended coherent processor 110, squarers 112I and 112Q, and a summer 114. The extended coherent processor 110 includes a data stripper 116 and accumulators 118I and 118Q. The data stripper 116 strips the GPS data bit information from the $I_{LVL}$ and $Q_{LVL}$ correlation data. For two level (one bit) information this is accomplished by inverting or non-inverting the $I_{LVL}$ and $Q_{LVL}$ correlation data according to the senses of the GPS data bits for providing I and Q correlation data. The accumulators 118I and 118Q accumulate the stripped $I_{LVL}$ and $Q_{LVL}$ correlation data for providing levels of I and Q extended correlation data $I_{ELVL}$ and $Q_{ELVL}$ for coherent integration periods of greater than the length of the data bits (currently specified at 20 milliseconds in the GPS specification). For example, if the GPS data bits are a "1" followed by a "0", the data stripper 110 non-inverts the $I_{LVL}$ and $Q_{LVL}$ correlation data for the 20 milliseconds during the "1" data bit and inverts the $I_{LVL}$ and $Q_{LVL}$ correlation data for the 20 milliseconds during the "0" data bit (or vice versa). The senses of the GPS data bits may be obtained from a network connection.

The squarers 112I and 112Q square the $I_{ELVL}$ and $Q_{ELVL}$ correlation data. The summer 114 sums the squares of the levels of the $I_{ELVL}$ and $Q_{ELVL}$ correlation data for providing the sum of the squares ($I_{ELVL}^2 + Q_{ELVL}^2$). When one of the sums exceeds the threshold, the corresponding code phase of the largest sum is used as the initial code phase for the code tracking process 46. Extended coherent integration periods of 40 milliseconds have a processing gain of 16 dB for reception as low as about −146 dBm; extended coherent integration periods of 100 milliseconds have a gain 20 dB for reception as low as about −150 dBm; and extended coherent integration periods of 400 milliseconds have a gain of 26 dB for reception as low as about −156 dBm. A table showing the way in which the extended coherent code acquisition process 45B processes the $I_{LVL}$ and $Q_{LVL}$ correlation data is illustrated in FIG. 4B and described in the accompanying detailed description below.

For a 20 millisecond coherent acquisition integration periods the carrier mixing frequencies are stepped in about 25 Hertz steps; for a 40 millisecond extended coherent acquisition integration periods the carrier mixing frequencies are stepped in about 12½ Hertz steps; and so on where the step size is calculated in Hertz as 25 times 20 divided by the coherent integration period in milliseconds. It should be noted that the coherent acquisition integration periods are not required to be integer multiples of 20 milliseconds. For example, for 50 millisecond coherent integration periods, the processing gain is step size is preferably about 10 Hertz.

FIG. 3C is a block diagram of the coherent-incoherent embodiment 45C of the code acquisition process 45 referred to by a reference number 45C. The code acquisition process 45C includes squarers 122I and 122Q, incoherent summers 124I and 124Q, and a summer 126. The squarers 122I and 122Q square the levels of the $I_{LVL}$ and $Q_{LVL}$ correlation data for providing $I_{LVL}^2$ and $Q_{LVL}^2$ for "N" of the 20 millisecond coherent acquisition integration periods for each code phase. The incoherent summers 124I and 124Q sum the squares $I_{LVL}^2$ and $Q_{LVL}^2$ of the correlation data $I_{LVL}$ and $Q_{LVL}$ for each coherent acquisition integration period for each code phase. The summer 126 sums squared correlation data for providing an incoherent sum. A table showing the way in which the coherent incoherent code acquisition process 45C uses the $I_{LVL}$ and $Q_{LVL}$ correlation data is illustrated in FIG. 4C and described in the accompanying detailed description below.

A coherent-incoherent period of one second made up of fifty incoherent sums of the 20 millisecond coherent integrations gives a processing gain of about 8.5 dB for the fifty incoherent periods plus 13 dB for the 20 millisecond coherent integration period for a total processing gain of about 21.5 dB resulting in an improvement of initial acquisition (no GPS signal is being tracked before acquisition) power level from −130 dBm to about −151.5 dBm. A coherent-incoherent period of 80 milliseconds made up of four incoherent sums of the 20 millisecond coherent integrations gives a processing gain of about 3 dB for the twenty incoherent periods plus 13 dB for the 20 millisecond coherent integration period for a total processing gain of about 16 dB resulting in an improvement of initial acquisition power level from −130 dBm to about −146 dBm. A coherent incoherent period of 10 seconds made up of five hundred incoherent sums of the 20 millisecond coherent integrations gives a processing gain of about 13.5 dB for the five hundred incoherent periods plus 13 dB for the 20 millisecond coherent integration period for a total processing gain of 26.5 dB resulting in an improvement of initial acquisition power level from −130 dBm to about −156.5 dBm.

Processing gain and improvement in acquisition and tracking signal levels can be tested by inserting a variable attenuator in a cable path between a passive patch antenna and a receiver preamplifier. The receiver preamplifier may be a part of the frequency downconverter 14. A reference initial acquisition and/or tracking attenuator setting is found for a conventional GPS receiver using one millisecond coherent integration periods for the lowest signal that can be acquired or tracked. The reference attenuator setting establishes a reference 0 dB processing gain. The improvement of processing gain with the present invention is then found by determining the maximum additional attenuation that can be inserted for acquisition and/or tracking. A GPS satellite simulator such as a NT Northern Telecom STR2760 GPS Satellite Simulator can also be used.

Figure 4A:
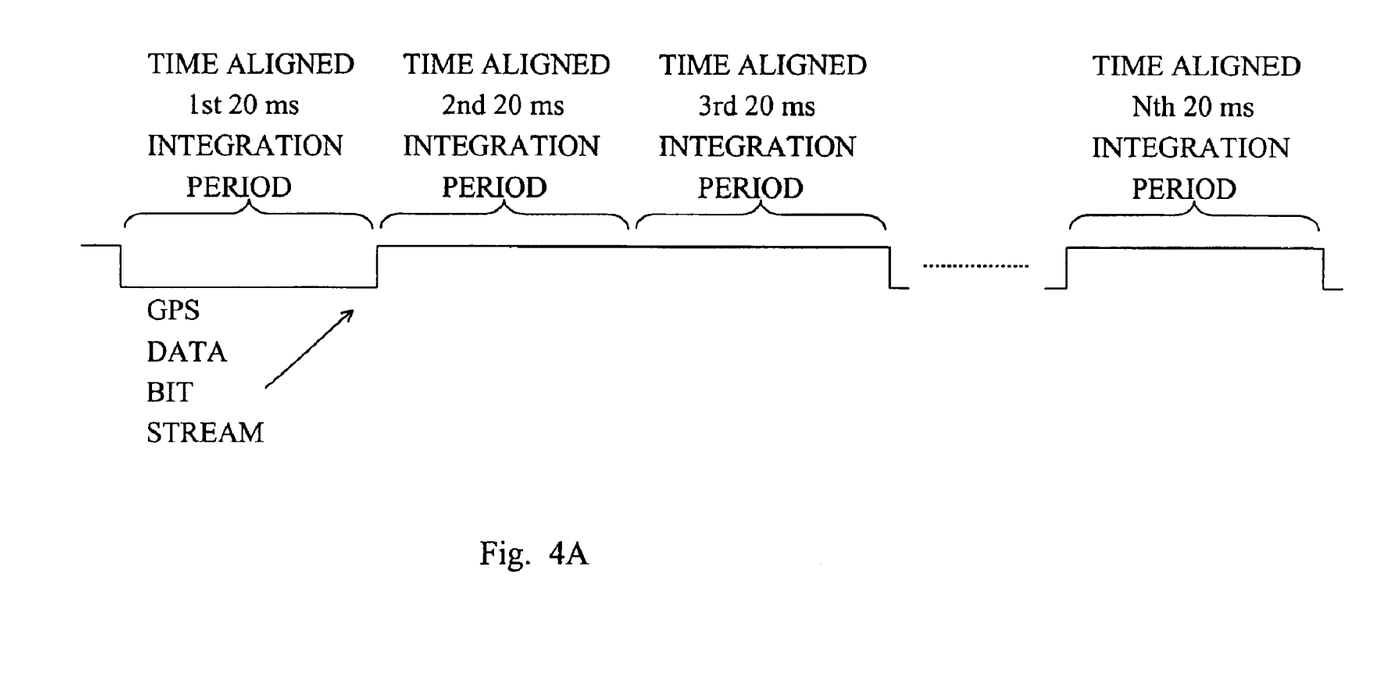
FIG. 4A is a timing diagram for the indoor GPS clock of FIG. 1.
Figure 4B:
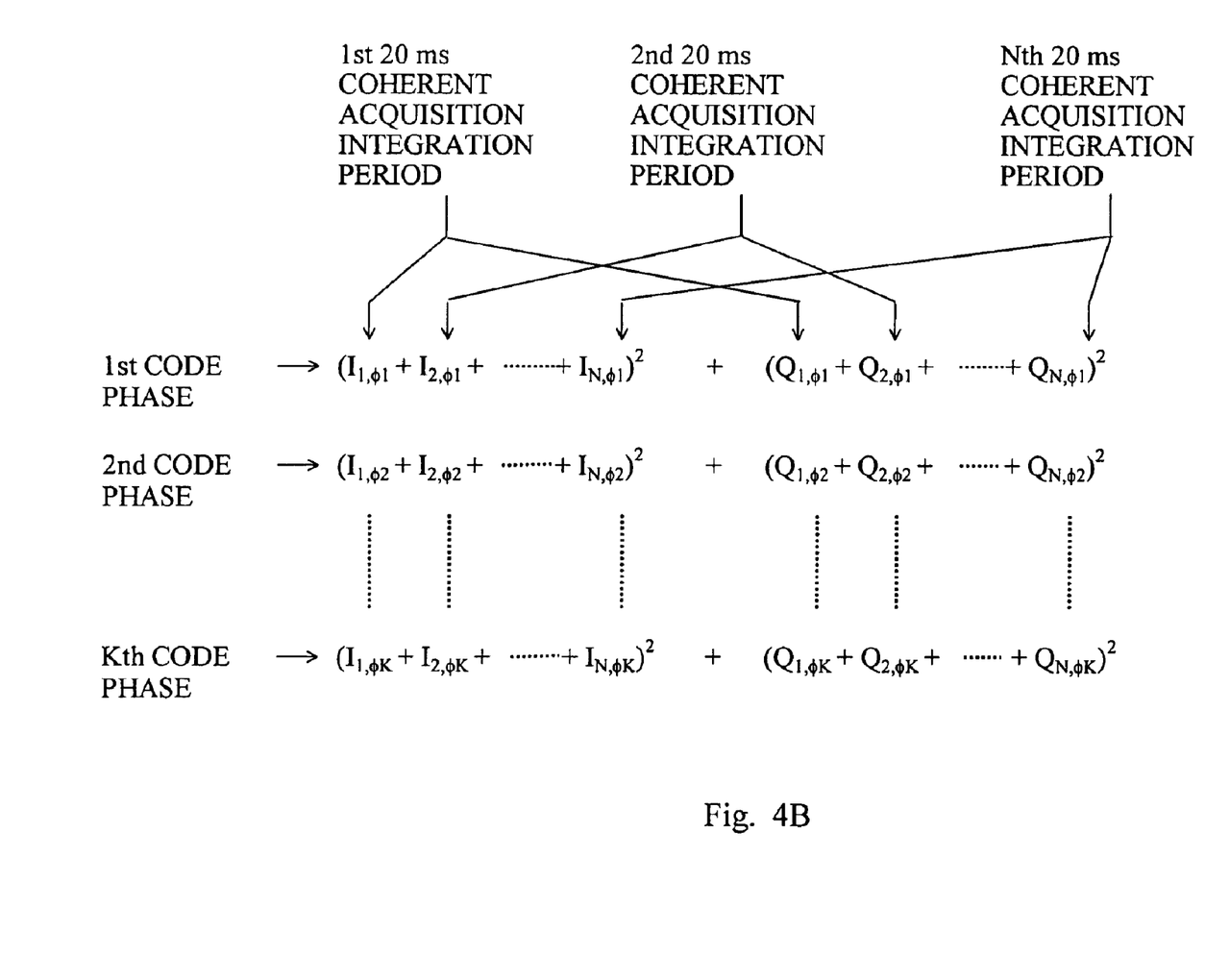
FIGS. 4B and 4C are tables for the embodiments of FIGS. 3B and 3C, respectively.
Figure 4C:
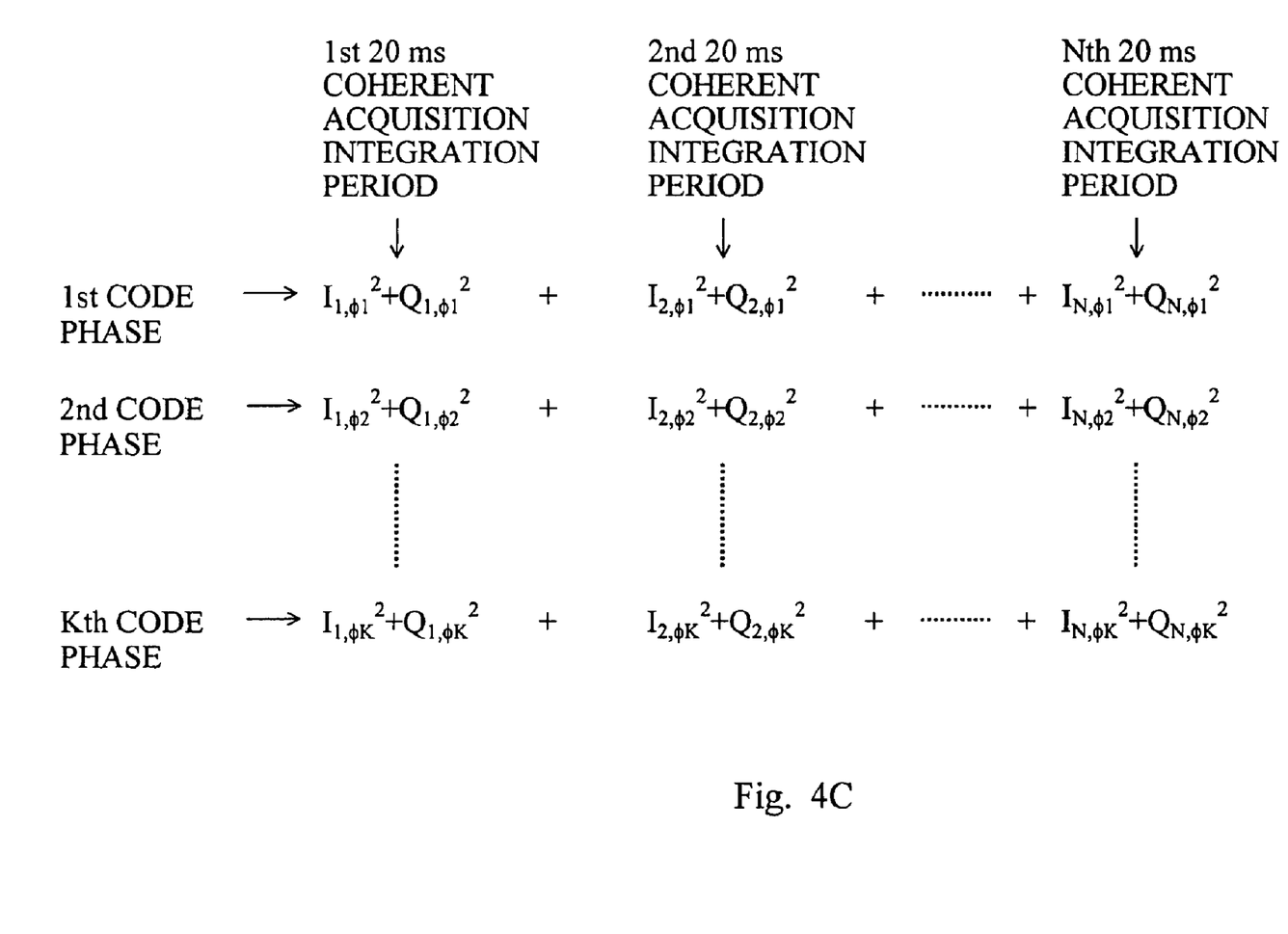

FIG. 4A is a timing diagram of the operation of the long integration correlation machine 18. The diagram shows a data bit stream of GPS data bits and 1st, 2nd, 3rd, and so on to an Nth 20 millisecond integration period. The data bits are known to be 20 milliseconds long. As described above the correlation machine 18 uses the time alignment information from the navigation processor 34 for aligning its integration periods to the data bits initially within ±½ millisecond and then more accurately after the GPS signal has been tracked.

FIG. 4B Is a table illustrating the way in which the extended coherent code acquisition process 45B processes the $I_{LVL}$ and $Q_{LVL}$ correlation data. The code acquisition process 45B receives $I_{LVL}$ and $Q_{LVL}$ correlation data for coherent acquisition integration periods (shown with subscripts 1, 2 and so on to N) and K possible code phases (shown with subscripts $\phi 1$, $\phi 2$, and so on to K). The I correlation data is $I_{1,\phi 1}$, $I_{2,\phi 1}$, and so on to $I_{N,\phi 1}$ for code phase one ($\phi_1$); $I_{1,\phi 2}$, $I_{2,\phi 2}$, and so on to $I_{N,\phi 2}$ for code phase two ($\phi_2$); continuing to $I_{1,\phi K}$, $I_{2,\phi K}$, and so on to $I_{N,\phi K}$ for code phase K ($\phi_K$). The $I_{ELVL}$ extended correlation level is $(I_{1,\phi 1}+I_{2,\phi 1}+ \ldots +I_{N,\phi 1})$ for code phase one ($\phi_1$); $(I_{1,\phi 2}+I_{2,\phi 2}+ \ldots +I_{N,\phi 2})$ for code phase two ($\phi_2$); and so on to $(I_{1,\phi K}+I_{2,\phi K}+ \ldots +I_{N,\phi K})$ for code phase K($\phi_K$). Similarly, the Q correlation data is $Q_{1,\phi 1}$, $Q_{2,\phi 1}$, and so on to $Q_{N,\phi 1}$; $Q_{1,\phi 2}$, $Q_{2,\phi 2}$, and so on to $Q_{N,\phi 2}$; continuing to $Q_{1,\phi K}$, $Q_{2,\phi K}$, and so on to $Q_{N,\phi K}$. The $Q_{ELVL}$ extended correlation level is $(Q_{1,\phi 1}+Q_{2,\phi 1}+ \ldots +Q_{N,\phi 1})$; $(Q_{1,\phi 2}+Q_{2,\phi 2}+ \ldots +Q_{N,\phi 2})$; and so on to $(Q_{1,\phi K}+Q_{2,\phi K}+ \ldots +Q_{N,\phi K})$.

The code acquisition process 45B determines the sum of the squares of the sums of the I and Q correlation levels $[(I_{1,\phi 1}+I_{2,\phi 1}+ \ldots +I_{N,\phi 1})^2+(Q_{1,\phi 1}+Q_{2,\phi 1}+ \ldots +Q_{N,\phi 1})^2]$ for code phase ($\phi_1$); the sum of the squares of the sums $[(I_{1,\phi 2}+I_{2,\phi 2}+ \ldots +I_{N,\phi 2})^2+(Q_{1,\phi 2}+Q_{2,\phi 2}+ \ldots +Q_{N,\phi 2})^2]$ for code phase ($\phi_2$); and so on to the sum of the squares of the sums $[(I_{1,\phi K}+I_{2,\phi K}+ \ldots +I_{N,\phi K})^2+(Q_{1,\phi K}+Q_{2,\phi K}+ \ldots + Q_{N,\phi K})^2]$ for code phase ($\phi_K$). The largest of the sums of squares of the sums is compared to an acquisition threshold. When the largest exceeds the threshold, the corresponding code phase is used as the initial code phase for the code tracking process 46.

FIG. 4C is a table illustrating the way in which the coherent-incoherent code acquisition process 45C processes the $I_{LVL}$ and $Q_{LVL}$ correlation data. The code acquisition process 45C receives $I_{LVL}$ and $Q_{LVL}$ correlation data for coherent acquisition integration periods (shown with subscripts 1, 2 and so on to N) and K possible code phases (shown with subscripts $\phi 1$, $\phi 2$, and so on to K). The I correlation data is $I_{1,\phi 1}$, $I_{2,\phi 1}$, and so on to $I_{N,\phi 1}$ for code phase one ($\phi_1$); $I_{1,\phi 2}$, $I_{2,\phi 2}$, and so on to $I_{N,\phi 2}$ for code phase two ($\phi_2$); continuing to $I_{1,\phi K}$, $I_{2,\phi K}$, and so on to $I_{N,\phi K}$ for code phase K ($\phi_K$). Similarly, the Q correlation data is $Q_{1,\phi 1}$, $Q_{2,\phi 1}$, and so on to $Q_{N,\phi 1}$; $Q_{1,\phi 2}$, $Q_{2,\phi 2}$, and so on to $Q_{N,\phi 2}$; continuing to $Q_{1,\phi K}$, $Q_{2,\phi K}$, and so on to $Q_{N,\phi K}$. The code acquisition process 45C determines the sum of the squares of the I and Q correlation levels $(I^2_{1,\phi 1}+I^2_{2,\phi 1}+ \ldots +I^2_{N,\phi 1}+Q^2_{1,\phi 1}+Q^2_{2,\phi 1}+ \ldots +Q^2_{N,\phi 1})$ for code phase ($\phi_1$); the sum of the squares $(I^2_{1,\phi 2}+I^2_{2,\phi 2}+ \ldots +I^2_{N,\phi 2}+Q^2_{1,\phi 2}+Q^2_{2,\phi 2}+ \ldots +Q^2_{2,\phi 2})$ for code phase ($\phi_2$); and so on to the sum of the squares $(I^2_{1,\phi K}+I^2_{2,\phi K}+ \ldots +I^2_{N,\phi K}+Q^2_{1,\phi K}+Q^2_{2,\phi K}+ \ldots +Q^2_{N,\phi K})$ for code phase ($\phi_K$). The largest of the sum of the squares is compared to an acquisition threshold. When the largest sum exceeds the threshold, the corresponding code phase is used as the initial code phase for the code tracking process 46.

It will be appreciated by those having ordinary knowledge of the art that the code acquisition process 45 also includes search algorithms, filters and other conditioning elements for processing the I and Q correlation data in order to control the PRN code generator 24 for GPS signal acquisition.

Returning to FIG. 1, the correlation machine 18 provides sequential coherent integrations for 20 millisecond periods for prompt I correlation $I_P$, early minus late I correlation $I_{E-L}$, prompt Q correlation $Q_P$, and early minus late Q correlation $Q_{E-L}$. The code tracking process 46 computes $\theta_{ERR}$ according to an equation 1.

$$\theta_{ERR}=(I_P*I_{E-L}+Q_P*Q_{E-L})/(I_P^2+Q_P^2) \tag{1}$$

The code tracking process 46 filters the $\theta_{ERR}$ with a narrow bandwidth, preferably about one Hertz, for the code adjustment feedback to the PRN code generator 24 in order to continue to track low level GPS signals after they have been acquired. Those having ordinary knowledge in the art will understand that the code tracking process 46 also includes filtering, carrier aiding, and other conditioning elements for minimizing noise and stabilizing the signal tracking loop 48.

The indoor GPS clock 10 as described above can be implemented with a combination of DSP hardware and software and microprocessor hardware and software where the software is stored in memory devices of various types. Those skilled in the art will recognize the separate functions of the elements as described above can operate with shared hardware and be allocated in various ways between DSP devices, microprocessor devices, and memory.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A method for providing a frequency standard signal, comprising:
    acquiring a global positioning system (GPS) signal using an acquisition time period of at least two GPS data bit times for determining correlation sums for code phases, respectively;
    carrier-less tracking said GPS signal, after said GPS signal has been acquired, for providing a clock bias error; and
    disciplining said frequency standard signal with said clock bias error for tracking said GPS carrier frequency wherein:
    said GPS signal is less than or equal to about −146 dBm.

2. The method of claim 1, wherein:
    carrier-less tracking includes estimating Doppler shifts of said GPS signal from GPS orbital data; and using said estimated Doppler shifts for tracking said GPS signal frequency without frequency feedback correction from said GPS signal.

3. The method of claim 1, wherein:
    said acquisition time period includes a plurality of coherent integration periods each covering at least ten epochs of said code phases; and acquiring includes determining a plurality of correlation levels for said plurality of coherent integration periods, respectively, for said code phases; and then incoherently combining said correlation levels at corresponding ones of said code phases for providing said correlation sums.

4. The method of claim 1, wherein:
disciplining said frequency standard signal includes monitoring said clock bias error for predicting a frequency drift for said frequency standard signal while said GPS signal is being tracked; and using said predicted frequency drift for adjusting said clock bias error for compensating for said frequency drift when said GPS signal is not being tracked.

5. The method of claim 4, wherein:
predicting said frequency drift includes determining at least one of aging and temperature dependence for said frequency standard signal.

6. A method for providing a frequency standard signal, comprising:
acquiring a global positioning system (GPS) signal using an acquisition time period of at least two GPS data bit times for determining correlation sums for code phases, respectively:
carrier-less tracking said GPS signal, after said GPS signal has been acquired, for providing a clock bias error; and
disciplining said frequency standard signal with said clock bias error for tracking said GPS carrier frequency; wherein:
said acquisition time period includes a plurality of coherent integration periods each covering at least ten epochs of said code phases;
acquiring includes determining a plurality of correlation levels for said plurality of coherent integration periods, respectively, for said code phases; and then incoherently combining said correlation levels at corresponding ones of said code phases for providing said correlation sums; and
incoherently combining includes summing squares of at least first and second said correlation levels corresponding to at least first and second said coherent integration periods.

7. The method of claim 6, wherein:
carrier-less tracking includes estimating Doppler shifts of said GPS signal from GPS orbital data; and using said estimated Doppler shifts for tracking said GPS signal frequency without frequency feedback correction from said GPS signal.

8. The method of claim 6, wherein:
disciplining said frequency standard signal includes monitoring said clock bias error for predicting a frequency drift for said frequency standard signal while said GPS signal is being tracked; and using said predicted frequency drift for adjusting said clock bias error for compensating for said frequency drift when said GPS signal is not being tracked.

9. The method of claim 8, wherein:
predicting said frequency drift includes determining at least one of aging and temperature dependence for said frequency standard signal.

10. A method for providing a frequency standard signal, comprising:
acquiring a global positioning system (GPS) signal using an acquisition time period of at least two GPS data bit times for determining correlation sums for code phases, respectively;
carrier-less tracking said GPS signal, after said GPS signal has been acquired, for providing a clock bias error; and
disciplining said frequency standard signal with said clock bias error for tracking said GPS carrier frequency; wherein:
said acquisition time period includes an extended coherent integration period having a plurality of coherent integration periods each covering at least forty epochs of said code phases; and
acquiring includes determining a plurality of correlation levels for a plurality of coherent integration periods, respectively, for said code phases; stripping GPS data bit senses from said correlation levels for providing data stripped correlation levels; and then coherently combining said data stripped correlation levels at corresponding ones of said code phases for providing said correlation sums for said extended coherent integration period.

11. The method of claim 10, wherein:
coherently combining includes summing at least first and at least second said data stripped correlation levels corresponding to first and second said coherent integration periods.

12. The method of claim 10, wherein:
carrier-less tracking includes estimating Doppler shifts of said GPS signal from GPS orbital data; and using said estimated Doppler shifts for tracking said GPS signal frequency without frequency feedback correction from said GPS signal.

13. The method of claim 10, wherein:
disciplining said frequency standard signal includes monitoring said clock bias error for predicting a frequency drift for said frequency standard signal while said GPS signal is being tracked; and using said predicted frequency drift for adjusting said clock bias error for compensating for said frequency drift when said GPS signal is not being tracked.

14. The method of claim 13, wherein:
predicting said frequency drift includes determining at least one of aging and temperature dependence for said frequency standard signal.

15. A method for providing a frequency standard signal, comprising:
acquiring a global positioning system (GPS) signal using an acquisition time period of at least two GPS data bit times for determining correlation sums for code phases, respectively;
carrier-less tracking said GPS signal after said GPS signal has been acquired, for providing a clock bias error; and
disciplining said frequency standard signal with said clock bias error for tracking said GPS carrier frequency; wherein:
acquiring said GPS signal includes using coherent integration times for said acquisition time periods for a processing gain of at least 16 dB with respect to a coherent integration time of one millisecond.

16. The method of claim 15, wherein:
carrier-less tracking includes estimating Doppler shifts of said GPS signal from GPS orbital data; and using said estimated Doppler shifts for tracking said GPS signal frequency without frequency feedback correction from said GPS signal.

17. The method of claim 15, wherein:
disciplining said frequency standard signal includes monitoring said clock bias error for predicting a frequency drift for said frequency standard signal while said GPS signal is being tracked; and using said predicted frequency drift for adjusting said clock bias error for compensating for said frequency drift when said GPS signal is not being tracked.

18. The method of claim 17, wherein:

predicting said frequency drift includes determining at least one of aging and temperature dependence for said frequency standard signal.

19. A GPS clock using a GPS signal for providing a frequency standard signal, comprising:

a long integration correlation machine for acquiring a global positioning system (GPS) signal using an acquisition time period of at least two GPS data bit times for determining correlation sums for code phases, respectively;

a signal tracking loop using the correlation machine for carrier-less tracking said GPS signal, after said GPS signal has been acquired, for providing a clock bias error; and a clock bias loop including the signal tracking loop for disciplining said frequency standard signal with said clock bias error for tracking said GPS carrier frequency; wherein:

said GPS signal is less than or equal to about −146 dBm.

20. The GPS clock of claim 19, wherein:

the signal tracking loop estimates Doppler shifts of said GPS signal from GPS orbital data; and uses said estimated Doppler shifts for tracking said GPS signal frequency without frequency feedback correction from said GPS signal.

21. The GPS clock of claim 19, wherein:

said acquisition time period includes a plurality of coherent integration periods each covering at least ten epochs of said code phases; and the long integration correlation machine determines a plurality of correlation levels for said plurality of coherent integration periods, respectively, for said code phases; and then incoherently combines said correlation levels at corresponding ones of said code phases for providing said correlation sums.

22. The GPS clock of claim 19, wherein:

the clock bias loop includes a holdover driver for monitoring said clock bias error while the signal tracking loop is carrier-less tracking said GPS signal for predicting a frequency drift for said frequency standard signal; and using said predicted frequency drift for adjusting said clock bias error for compensating for said frequency drift when said GPS signal is not being tracked.

23. The GPS clock of claim 22, wherein:

said holdover driver predicts said frequency drift by determining at least one of aging and temperature dependence for said frequency standard signal.

24. A GPS clock using a GPS signal for providing a frequency standard signal, comprising:

a long integration correlation machine for acquiring a global positioning system (GPS) signal using an acquisition time period of at least two GPS data bit times for determining correlation sums for code phases, respectively;

a signal tracking loop using the correlation machine for carrier-less tracking said GPS signal, after said GPS signal has been acquired, for providing a clock bias error; and a clock bias loop including the signal tracking loop for disciplining said frequency standard signal with said clock bias error for tracking said GPS carrier frequency; wherein:

said acquisition time period includes a plurality of coherent integration periods each covering at least ten epochs of said code phases;

the long integration correlation machine determines a plurality of correlation levels for said plurality of coherent integration periods, respectively, for said code phases; and then incoherently combines said correlation levels at corresponding ones of said code phases for providing said correlation sums; and the long integration correlation machine combines said correlation levels by summing squares of at least first and second said correlation levels corresponding to at least first and second said coherent integration periods.

25. The GPS clock of claim 24, wherein:

the signal tracking loop estimates Doppler shifts of said GPS signal from GPS orbital data; and uses said estimated Doppler shifts for tracking said GPS signal frequency without frequency feedback correction from said GPS signal.

26. The GPS clock of claim 24, wherein:

the clock bias loop includes a holdover driver for monitoring said clock bias error while the signal tracking loop is carrier-less tracking said GPS signal for predicting a frequency drift for said frequency standard signal; and using said predicted frequency drift for adjusting said clock bias error for compensating for said frequency drift when said GPS signal is not being tracked.

27. The GPS clock of claim 26, wherein:

said holdover driver predicts said frequency drift by determining at least one of aging and temperature dependence for said frequency standard signal.

28. A GPS clock using a GPS signal for providing a frequency standard signal, comprising:

a long integration correlation machine for acquiring a global positioning system (GPS) signal using an acquisition time period of at least two GPS data bit times for determining correlation sums for code phases, respectively;

a signal tracking loop using the correlation machine for carrier-less tracking said GPS signal, after said GPS signal has been acquired, for providing a clock bias error; and a clock bias loop including the signal tracking loop for disciplining said frequency standard signal with said clock bias error for tracking said GPS carrier frequency; wherein:

said acquisition time period includes an extended coherent integration period having a plurality of coherent integration periods each covering at least forty epochs of said code phases; and the long integration correlation machine coherently determines a plurality of correlation levels for a plurality of coherent integration periods, respectively, for said code phases; strips GPS data bit senses from said correlation levels for providing data stripped correlation levels; and then coherently combines said data stripped correlation levels at corresponding ones of said code phases for providing said correlation sums for said extended coherent integration period.

29. The GPS clock of claim 28, wherein:

the long integration correlation machine combines said data stripped correlation levels by summing at least first and second said data stripped correlation levels corresponding to at least first and second said coherent integration periods.

30. The GPS clock of claim 28, wherein:

the signal tracking loop estimates Doppler shifts of said GPS signal from GPS orbital data; and uses said estimated Doppler shifts for tracking said GPS signal frequency without frequency feedback correction from said GPS signal.

31. The GPS clock of claim 28, wherein:

the clock bias loop includes a holdover driver for monitoring said clock bias error while the signal tracking loop is carrier-less tracking said GPS signal for predicting a frequency drift for said frequency standard signal; and using said predicted frequency drift for adjusting said clock bias error for compensating for said frequency drift when said GPS signal is not being tracked.

32. The GPS clock of claim 31, wherein:

said holdover driver predicts said frequency drift by determining at least one of aging and temperature dependence for said frequency standard signal.

33. The GPS clock of claim 28, wherein:

the signal tracking loop estimates Doppler shifts of said GPS signal from GPS orbital data; and uses said estimated Doppler shifts for tracking said GPS signal frequency without frequency feedback correction from said GPS signal.

34. The GPS clock of claim 28, wherein:

the clock bias loop includes a holdover driver for monitoring said clock bias error while the signal tracking loop is carrier-less tracking said GPS signal for predicting a frequency drift for said frequency standard signal; and using said predicted frequency drift for adjusting said clock bias error for compensating for said frequency drift when said GPS signal is not being tracked.

35. The GPS clock of claim 34, wherein:

said holdover driver predicts said frequency drift by determining at least one of aging and temperature dependence for said frequency standard signal.

36. A GPS clock using a GPS signal for providing a frequency standard signal, comprising:

a long integration correlation machine for acquiring a global positioning system (GPS) signal using an acquisition time period of at least two GPS data bit times for determining correlation sums for code phases, respectively;

a signal tracking loop using the correlation machine for carrier-less tracking said GPS signal, after said GPS signal has been acquired, for providing a clock bias error; and a clock bias loop including the signal tracking loop for disciplining said frequency standard signal with said clock bias error for tracking said GPS carrier frequency; wherein:

the long integration correlation machine uses coherent acquisition integration periods for a processing gain of at least 16 dB with respect to a processing gain for a coherent integration period of one millisecond.

* * * * *